(12) United States Patent
Zhao

(10) Patent No.: US 11,903,064 B2
(45) Date of Patent: Feb. 13, 2024

(54) NETWORK CONNECTION MANAGEMENT ACROSS A MULTI-BAND WIRELESS NETWORK

(71) Applicant: ARRIS Enterprises LLC, Suwanee, GA (US)

(72) Inventor: Penghui Zhao, Shenzhen (CN)

(73) Assignee: ARRIS ENTERPRISES LLC, Horsham, PA (US)

( * ) Notice: Subject to any disclaimer, the term of this patent is extended or adjusted under 35 U.S.C. 154(b) by 419 days.

(21) Appl. No.: 17/413,112

(22) PCT Filed: Dec. 27, 2018

(86) PCT No.: PCT/CN2018/124360
§ 371 (c)(1),
(2) Date: Jun. 11, 2021

(87) PCT Pub. No.: WO2020/133065
PCT Pub. Date: Jul. 2, 2020

(65) Prior Publication Data
US 2022/0030653 A1 Jan. 27, 2022

(51) Int. Cl.
*H04W 76/15* (2018.01)
*H04W 88/10* (2009.01)

(52) U.S. Cl.
CPC .......... *H04W 76/15* (2018.02); *H04W 88/10* (2013.01)

(58) Field of Classification Search
CPC ..... H04W 88/10; H04W 76/15; H04W 72/52; H04W 48/06; H04W 84/12
See application file for complete search history.

(56) References Cited

U.S. PATENT DOCUMENTS 9,078,192 B2 7/2015 Iyer
2016/0029248 A1 1/2016 Syed et al.
(Continued)

FOREIGN PATENT DOCUMENTS

CN 106714277 5/2017
CN 106851683 6/2017
(Continued)

OTHER PUBLICATIONS

Office Action dated Jun. 19, 2023 in Canadian Patent Application No. 3,125,052.
(Continued)

*Primary Examiner* — Syed Ali
(74) *Attorney, Agent, or Firm* — Wenderoth, Lind & Ponack, L.L.P.

(57) ABSTRACT

An example method includes receiving a connection request from a pending computing device to connect via one of multiple RF communication bands of a wireless network. The method further includes, in response to receiving the connection request from the pending computing device, determining whether a multiple RF communication band utilization threshold is exceeded by the connection request from the pending computing device. The method further includes in response to determining that the multiple RF communication band communication utilization threshold is not exceeded, establishing connection with the pending computing device via one of the multiple RF communication bands of the wireless network to enable communication of the pending computing device over the wireless network.

20 Claims, 13 Drawing Sheets

(56) References Cited

U.S. PATENT DOCUMENTS

| | | | |
|---|---|---|---|
| 2016/0192381 A1 | 6/2016 | Gao et al. | |
| 2017/0086214 A1* | 3/2017 | Kalhan | H04W 16/14 |
| 2017/0142592 A1* | 5/2017 | Fischer | H04W 16/14 |
| 2018/0324607 A1* | 11/2018 | Rengarajan | H04W 24/02 |
| 2019/0349930 A1* | 11/2019 | Chu | H04W 72/0453 |
| 2023/0119722 A1* | 4/2023 | Guo | H04W 72/542 370/329 |
| 2023/0189058 A1* | 6/2023 | Yeh | H04W 28/0865 370/329 |

FOREIGN PATENT DOCUMENTS

| | | |
|---|---|---|
| CN | 108966335 | 12/2018 |
| EP | 3 398 369 | 11/2018 |

OTHER PUBLICATIONS

Extended European Search Report dated Jul. 6, 2022 in European Application No. 18944580.0.
International Search Report and Written Opinion of the International Searching Authority dated Oct. 8, 2019, in Internation (PCT) Application No. PCT/CN2018/124360.

* cited by examiner

NETWORK CONNECTION MANAGEMENT ACROSS A MULTI-BAND WIRELESS NETWORK

TECHNICAL FIELD

The examples described herein, in general, related to techniques and equipment to manage the maximum number of computing devices connected to a network access point, across multiple or all radio bands in a dual-band or multi-band system.

BACKGROUND

In October 2009, the Institute of Electrical and Electronics Engineers (IEEE) published the IEEE 802.11n wireless networking standard, a standard that has since been adopted widely in the consumer and commercial wireless router production market. It was among the first standards to proliferate dual-band technology—allowing channel connections in the 2.4 GHz channel range, as well as the 5.0 GHz channel range. In many implementations, these two channel ranges are controlled by and connected to separate hardware components, as well as separated internal network traffic control components.

These separately managed 2.4 GHz mode and 5.0 GHz mode make sense when assuming the bandwidth of the router or gateway to the larger network is either magnitudinally or effectively infinitely larger than the bandwidth of the antennas on the router for managing client connections. The router or gateway's network throughput is substantially limited only by the capacity of its antennas, and therefore practically only needs to manage the capacity of those antennas. With antennas on different channel ranges, they have no capacity to interfere with each other, and so can and should be managed separately.

However, as wireless radio antennas have improved, and LAN and WAN networks are designed more often with an eye to reduce waste, managing channels exclusively separately becomes less ideal. For example, assume a wireless router with two radio antennas, one for the 2.4 GHz range, one for the 5.0 GHz range. Both are separately capable of a bandwidth of 100 Mb/sec. Further assume the hard wired connection, connecting the wireless router to the larger network, also is capable of a bandwidth of 100 Mb/sec. A fully utilized system will result in the 2.4 GHz radio sending and/or receiving 100 Mb/sec to the router. It also will result in the 5.0 GHz radio sending and/or receiving 100 Mb/sec to the router. Each fully-utilized radio will reject new connections made to themselves, because each radio is aware of and manages its own capacity. Further assuming none of the network messaging requests are in-between clients on the same radio, or between clients on different radios on this same router. The router needs to communicate 200 Mb/sec to the larger network over its 100 Mb/sec hard wired connection. This will result in a substantial slowdown for all of the clients on this router, as the throughput they require is double the throughput available.

Some systems may require that any client connected to the router not experience slowdowns due to the router if they can make a valid connection. Some systems have other wireless gateways in the same service radius, so that being disconnected from a specific, at-capacity wireless gateway would allow for connecting to another underutilized gateway. These systems need a way to determine when an entire wireless router or gateway is fully utilized, even if any one or more of its radio bands is not fully utilized.

SUMMARY

In an example, a wireless communication system includes a wireless access point, which includes a group of multiple radio frequency (RF) communication band interfaces for establishing and maintaining computing device connections and communications over a wireless network having multiple RF communication bands. Each RF communication band interface is for RF communication over one of the RF band communication bands. Each RF communication band is a contiguous section of RF spectrum frequencies on the wireless network. The wireless access point additionally includes a processor coupled to the group of RF communication band interfaces and a memory accessible to the processor. The memory includes a multiple RF communication band utilization threshold imposing a combined wireless network capacity utilization limit on at least two of the multiple RF communication bands. The wireless access system further includes programming in the memory. Execution of the programming by the processor configures the wireless communication system to perform functions to receive a connection request from a pending computing device to connect via one of the multiple RF communication bands of the wireless network. Execution of the programming by the processor further configures the wireless communication system to receive the connection request from the pending computing device and determine whether the multiple RF communication band utilization threshold is exceeded by the connection request from the pending computing device. Execution of the programming by the processor further configures the wireless communication system to, in response to determining that the multiple RF communication band communication utilization threshold is not exceeded, establish connection with the pending computing device via one of the multiple RF communication bands of the wireless network to enable communication of the pending computing device over the wireless network.

In another example, a method comprises receiving a connection request from a pending computing device to connect via one of multiple RF communication bands of a wireless network. The method further includes, in response to receiving the connection request from the pending computing device, determining whether a multiple RF communication band utilization threshold is exceeded by the connection request from the pending computing device. The method further includes, in response to determining that the multiple RF communication band communication utilization threshold is not exceeded, establishing connection with the pending computing device via one of the multiple RF communication bands of the wireless network to enable communication of the pending computing device over the wireless network.

In a further example, a non-transitory machine-readable medium contains machine-readable programming instructions. The instructions cause a wireless communication system to receive a connection request from a pending computing device to connect via one of multiple RF communication bands of a wireless network. The instructions further cause the wireless communication system to, in response to receiving the connection request from the pending computing device, determine whether a multiple RF communication band utilization threshold is exceeded by the connection request from the pending computing device. The instructions further cause the wireless communication system to, in response to determining that the multiple RF communication band communication utilization threshold is not exceeded, establish connection with the pending computing device via one of the multiple RF communication bands of the wireless network to enable communication of the pending computing device over the wireless network.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The figures depict one or more implementations in accordance with the present teachings by way of example only, not by way of limitation. In the figures, like reference numbers refer to the same or similar elements.

DETAILED DESCRIPTION

In the following detailed description of certain embodiments, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high level, without detailed comment in order to avoid unnecessarily obscuring aspects of the present teachings.

Figure 1:
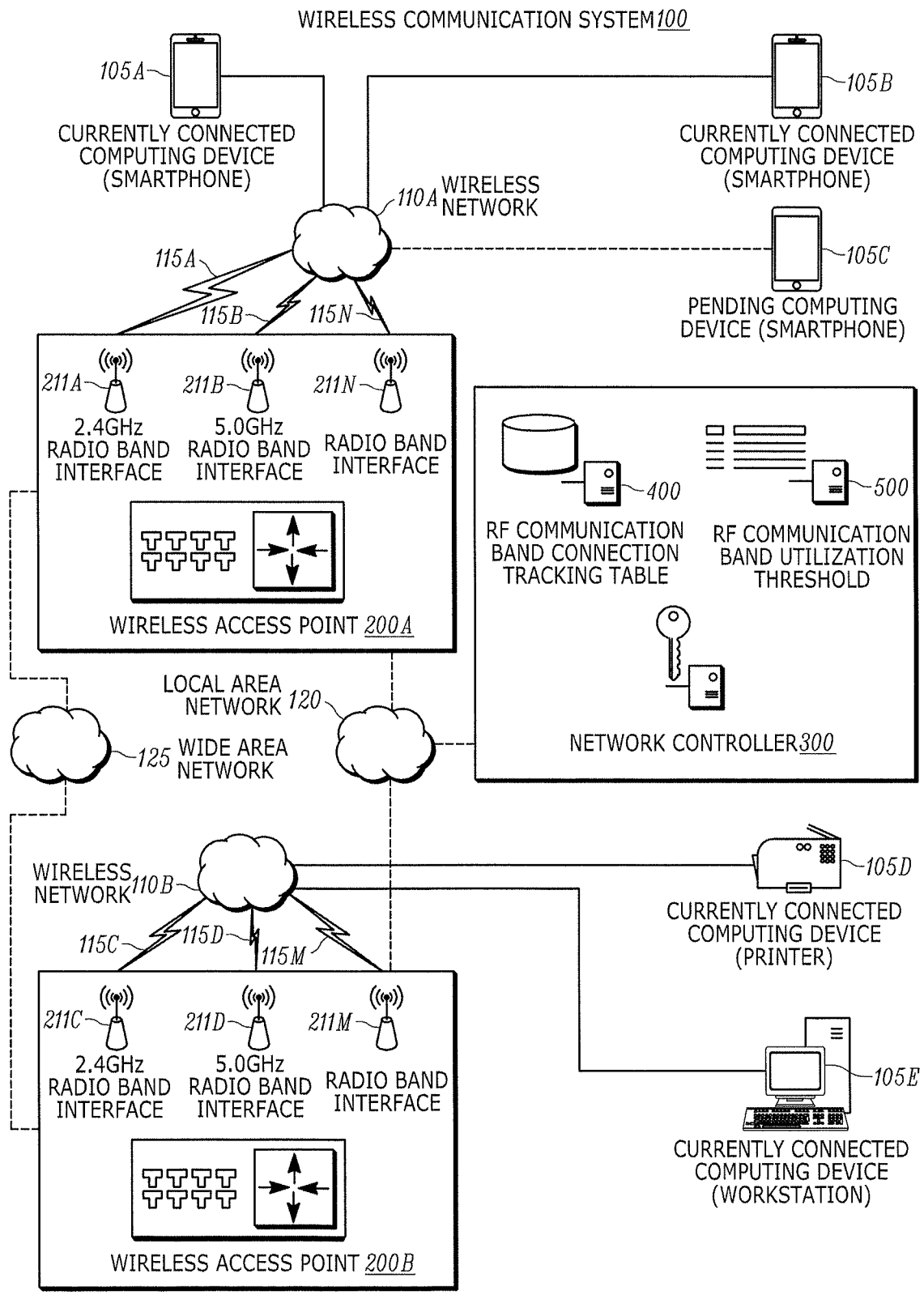
FIG. 1 is a network diagram with a network controller, multiple wireless access points as well as multiple computing devices, in an embodiment.

FIG. 1 is a network diagram of a wireless communication system 100, with a network controller 300, multiple wireless access points 200A-B as well as multiple computing devices 105A-E. The first wireless access point 200A includes a group of multiple radio frequency (RF) communication band interfaces 211A, 211B, and 211N. Although only two RF communication band interfaces are commonly used, in some examples, the group of multiple RF communication band interfaces of the first wireless access point 200A can include three (tri-band), four (quad-band), or more bands. At least one additional RF communication band interface 211N is shown. The group of multiple radio frequency (RF) communication band interfaces 211A, 211B and 211N are for establishing and maintaining computing device connections and communications over a first wireless network 110A having multiple RF communication bands 115A, 115B, and 115N. In the example, the multiple radio frequency (RF) communication band interfaces of the first wireless access point 200A is tri-banded, and thus includes three Wi-Fi radios, a 2.4 GHz radio 211A, a 5.0 GHz radio 211B, and an unlabeled radio 211N for communication over the RF bands 115A, 115B, and 115N of the first wireless network 110A. Each RF communication band interface 211A, 211B, 211N is for RF communication over one of the RF band communication bands 115A, 115B, and 115N. Each RF communication band 115A, 115B, and 115N is a contiguous section of RF spectrum frequencies on the wireless network 110A. Hence, the 2.4 GHz radio 211A communicates over the 2.4 GHz band 115A, the 5.0 GHz radio 211B communicates over the 5.0 GHz band 115B, and the third radio 211N communicates over the third band 115N of the first wireless network 110A.

A computing device 105, specifically a smartphone 105A, is connected to the first wireless network 110A via the 5.0 GHz radio 211B of the wireless access point 200A. Another computing device 105B is connected to the first wireless network 110A via the 2.4 GHz radio 211A of the wireless access point 200A. A third pending computing device 105C is attempting to connect to a local area network (LAN) 120, such as an Intranet, and/or a wide area network (WAN) 125, such as the Internet, via the first wireless access point 200A, but it has not been approved yet. A second wireless access point 200B is toward the bottom of the diagram, which is substantially similar to first wireless access point 200A. Second wireless access point 200B also includes multiple radio frequency (RF) communication band interfaces, shown as a 2.4 GHz radio 211C, a 5.0 GHz radio 211D and an unlabeled radio 211M for communication over the RF bands 115C, 115D, and 115M of the second wireless network 110B. There are two computing devices—a printer 105D and a desktop workstation 105E—connected to the second wireless network 110B, which communicate over the RF bands of the second wireless network 110B. It should be understood that wireless access points 200A-B (e.g., network gateways) are just one type of RADIUS client that can implement the multiple wireless network communication band controls described herein. For example, other RADIUS clients that behave as network access servers, such as 802.1X-capable switches, virtual private network (VPN) servers, and dial-up servers, which utilize the RADIUS protocol to communicate with RADIUS servers, such as Network Policy Server (NPS) servers, can implement the multiple wireless network communication band controls. In some examples, the wireless access pints 200A-B are network gateways, which communicate over the depicted WAN 125 to an authentication server (not shown), which implements the multiple wireless network communication band controls.

In this implementation, the network controller 300 contains RF communication band connecting tracking table(s) 400 for storing information related to computing devices 105A-B utilization of the first wireless network 110A. RF communication band connecting tracking table(s) 400 also stores information related to computing devices 105D-E utilization of the second wireless network 110B. Network controller 300 also contains the utilization thresholds 400 that define the maximum network utilization per wireless access points 200A-B to control respective wireless networks 110A-B. This network controller 300 does not form a chokepoint between the wireless access points 200A-B and the LAN 120, but rather directs the wireless access points 200A-B in whether to allow computing devices 105A-E to connect and wirelessly communicate over the respective first and second wireless networks 110A-B. Network controller 300 also determines whether the computing devices 105A-E can pass communications through the respective wireless access point 200A-B to the local area network 120 and eventually to a wide area network 125, such as the Internet. The network controller 300 communicates this to the wireless access points 200A-B over the local area network 120.

Figure 3:
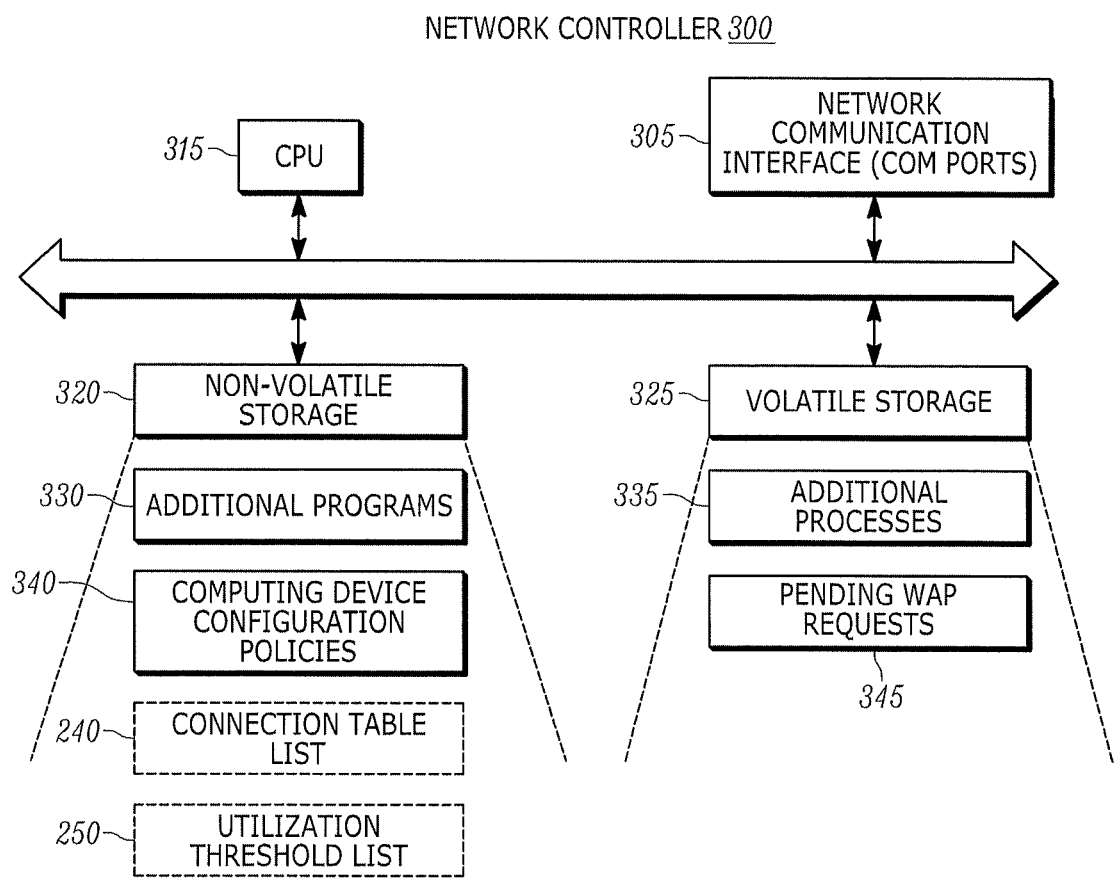
FIG. 3 shows an example of a hardware configuration for a network controller, in simplified block diagram form, in an embodiment.

In some examples, programming functions (instructions) for managing network connections from the computing devices 105A-C with the first wireless access point 200A across the multi-band first wireless network 110A can be incorporated in the network controller 300 in FIG. 1. Although not shown in FIG. 1, in the example, the network controller 300 includes a processor (see element 315 of FIG. 3) coupled to the group of RF communication band interfaces and a memory (see elements 320 and 325 of FIG. 3) accessible to the processor, which are depicted in FIG. 3. The memory (see elements 320 and 325 of FIG. 3) includes a multiple RF communication band utilization threshold 500 imposing a combined wireless network capacity utilization limit on at least two of the multiple RF communication bands 211A and 211B of the first wireless network 200A. The network controller 300 includes programming in the memory (see elements 320 and 325 of FIG. 3). Execution of the programming by the processor configures the network controller 300 to perform functions, including functions to receive a connection request from a pending computing device 105C to connect via one of the multiple RF communication bands 211A and 211B of the first wireless network 110A. In response to receiving the connection request from the pending computing device 105C, the network controller 300 determines whether the multiple RF communication band utilization threshold is exceeded by the connection request from the pending computing device 105C. In response to determining that the multiple RF communication band communication utilization threshold 500 (e.g., number of connected wireless clients) is not exceeded, the network controller 300 establishes connection with the pending computing device 105C via one of the multiple RF communication bands 115A, 115B, or 115N of the first wireless network 110A to enable communication of the pending computing device 105A over the first wireless network 110A.

In one example, the memory (see elements 320 and 325 of FIG. 3) of the network controller 300 further includes a multiple RF communication band connection tracking table 400 that includes RF connection records. For example, each RF connection record identifies a respective currently connected computing device 105A-B that is currently connected to the first wireless network 110A-B via one of the multiple RF communication bands 211A and 211B. Execution of the programming by the processor (see element 315 of FIG. 3) further configures the network controller 300 to calculate a total number of the currently connected computing devices 105A-B via the multiple RF communication bands 115A, 115B, and 115N. The multiple RF communication band utilization threshold 500 is a total connection limit across at least two of the multiple RF communication bands 115A, 115B, and 115N of the first wireless network 110A. Determining whether the multiple RF communication band utilization threshold 500 is exceeded includes comparing the total number of the currently connected computing devices 105A-B with the total connection limit.

In another example, the memory (see elements 320 and 325 of FIG. 3) further includes a multiple RF communication band connection tracking table 400 that includes RF connection records. Each RF connection record identifies a respective currently connected computing device 105A-B that is currently connected to the first wireless network 110A via one of the multiple RF communication bands 115A, 115B, or 115N and a respective bandwidth utilization of the respective currently connected computing device 105A-B over a predetermined time period. Execution of the programming by the processor (see element 315 of FIG. 3) further configures the network controller 300 to calculate a total bandwidth usage of the currently connected computing devices 105A-B based on the RF connection records. The multiple RF communication band utilization threshold is a bandwidth limit across at least two of the multiple RF communication bands 115A, 115B, and 115N of the first wireless network 110A. Determining whether the multiple RF communication band utilization threshold is exceeded includes comparing the total bandwidth usage with the total bandwidth limit.

In yet another example, execution of the programming by the processor (see element 315 of FIG. 3) further configures the network controller 300 to receive a second connection request from a second pending computing device (not shown) to connect via one of the multiple RF communication bands 115A, 115B, or 115N of the first wireless network 110A to enable communication over the first wireless network 110A. In response to receiving the second connection request from the second pending computing device (not shown), the network controller 300 determines whether the multiple RF communication band utilization threshold 500 is exceeded by the second connection request from the second pending computing device (not shown). In response to determining that the multiple RF communication band utilization threshold 500 is exceeded, the network controller 500 rejects connection with the second pending computing device (not shown) via one of the multiple RF communication bands 115A, 115B, or 115N of the first wireless network 110A.

It should be understood that the programming functions for the first wireless access point 200A may be directly incorporated into the first wireless access point 200A itself, divided up between network controller 200 and the first wireless access point 200A, or in other components of the wireless communication system 100. In a divided up arrangement, for example, execution of the programming by a first processor (see element 215 of FIG. 2) of the wireless access point 200A configures the first wireless access point 200A to perform the function to receive the connection request from the pending computing device 105C to connect via one of the multiple RF communication bands 115A, 115B, or 115N of the first wireless network 110A. Execution of the programming by the first processor (see element 215 of FIG. 2) of the wireless access point 200A further configures the first wireless access point 200A to perform the function to establish connection with the pending computing device 105C via one of the multiple RF communication bands 115A, 115B, or 115N of the first wireless network 110A to enable communication over the first wireless network 110A. First wireless access point 200A includes a first network communication interface (element 205 of FIG. 2) accessible to the first processor (element 215 of FIG. 2) for communication over the local area network 120 or the wide area network 125 with the network controller 300.

Execution of programming by a second processor (see element 315 of FIG. 3) of the network controller 300 configures the network controller 300 to perform the function to determine whether the multiple RF communication band utilization threshold 500 is exceeded by the connection request from the pending computing device 105C. Network controller 300 includes a second network communication interface (element 305 of FIG. 3) accessible to the second processor (element 315 of FIG. 3) for communication over the local area network 120 or the wide area network 125 with the first wireless access point 200A.

Figure 2:
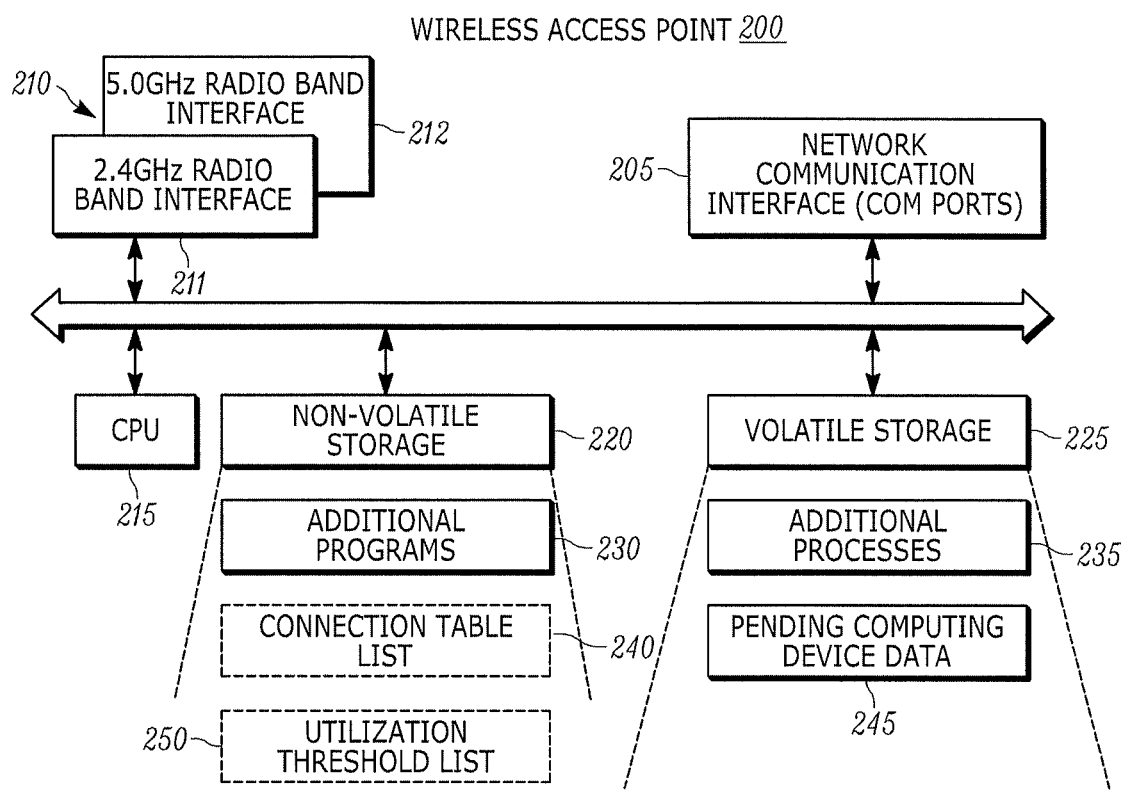
FIG. 2 shows an example of a hardware configuration for a wireless access point, in simplified block diagram form, in an embodiment.

FIG. 2 shows an example of a hardware configuration for the wireless access point (WAP) 200 in simplified block diagram form. In this example the WAP 200 includes a network communication interface (NCI) 205 that is for wired or wireless communication of multiple networks (e.g., WAN, LAN), USB connection, or any available data communication technology. NCI 205 can allow the WAP 200 to communicate with various devices such as the network controller 300 or other devices on the local area network 120.

The WAP 200 also includes circuits forming one or more processors to implement a central processing unit (CPU) 215 that controls operations of the WAP 200 including, depending on implementation, performing the processing to determine whether maximum computing device capacity has been reached.

As shown, the WAP 200 includes persistent non-volatile storage 220, such as ROM or flash memory for permanently storing the WAP's 200 functions related to pending computing device 105 connection approval or rejection based on band utilization 230. The non-volatile storage 220 also may contain the list of computing device connections 240, or the set value for maximum network utilization 250, depending on the implementation. The volatile storage 225 temporarily stores connection data, including any potential computing device 105 identifying information 245, and also stores various programming instructions 235.

The media forming the non-volatile storage 220 serves as permanent storage for the functions related to determining computing device 105 connection approval or rejection, but the volatile storage 225 is utilized for execution by the CPU 215.

In an example, the first wireless access point 200A further includes a network communication interface 205 for communication over a local area network 120 or a wide area network 125. The processor 215 of FIG. 2 is further coupled to the network communication interface 205 of FIG. 2. Execution of the programming by the processor 215 further configures the first wireless access point 200A to, based on establishing connection with the pending computing device 105C via one of the multiple RF communication bands 115A, 115B, and 115N of the first wireless network 110A, allow communication of the pending computing device 105C over the local area network 120 or the wide area network 125 through the network communication interface 205 of FIG. 2.

In another example, in response to receiving the connection request from the pending computing device 105C, execution of the programming by the first processor 215 further configures the wireless access point 200A to transmit, via a first network communication interface 205, an authorized connection instruction requesting the network controller 300 to determine whether the multiple RF communication band utilization threshold 500 is exceeded by the connection request from the pending computing device 105C. In response to receiving, from the network controller 300, the authorized connection instruction determining that the multiple RF communication band communication utilization threshold 500 is not exceeded, establish connection with the pending computing device 105C via one of the multiple RF communication bands 115A, 115B, and 115N of the first wireless network 110A to enable communication of the pending computing device 105C over the firs wireless network 110A.

FIG. 3 shows an example of a hardware configuration for the network controller (NC) 300 in simplified block diagram form. In this example the NC 300 includes network communication interface (NCI) 305 that are for wired or wireless communication of multiple networks (e.g., WAN, LAN), USB connection, or any available data communication technology. NCI 305 can allow the NP 300 communicate with various devices such as a wireless access point (WAP) 200 or other devices on the local area network 120.

The NC 300 also included circuits forming one or more processors to implement a central processing unit (CPU) 315 that controls operations of the NC 300 including, depending on implementation, performing the processing to determine whether maximum computing device capacity has been reached.

As shown, the NC 300 includes persistent non-volatile storage 320, such as ROM or flash memory for permanently storing functions determining computing device connection approval or rejection based on band utilization 330. The non-volatile storage 320 also may contain the list of computing device connections 240, or the set value or values for maximum network utilization 250, depending on the implementation of the network. Further, the non-volatile storage 320 contains client configuration policies 340, used to set the maximum network utilization for a WAP 200. The volatile storage 325 temporarily stores various programming instructions used in managing multi-band connections 335 as well as any pending WAP 200 requests 345.

The media forming the non-volatile storage 320 serves as permanent storage for the functions related to determining computing device connection approval or rejection, but the volatile storage 325 is utilized for execution by the CPU 315.

Figure 4:
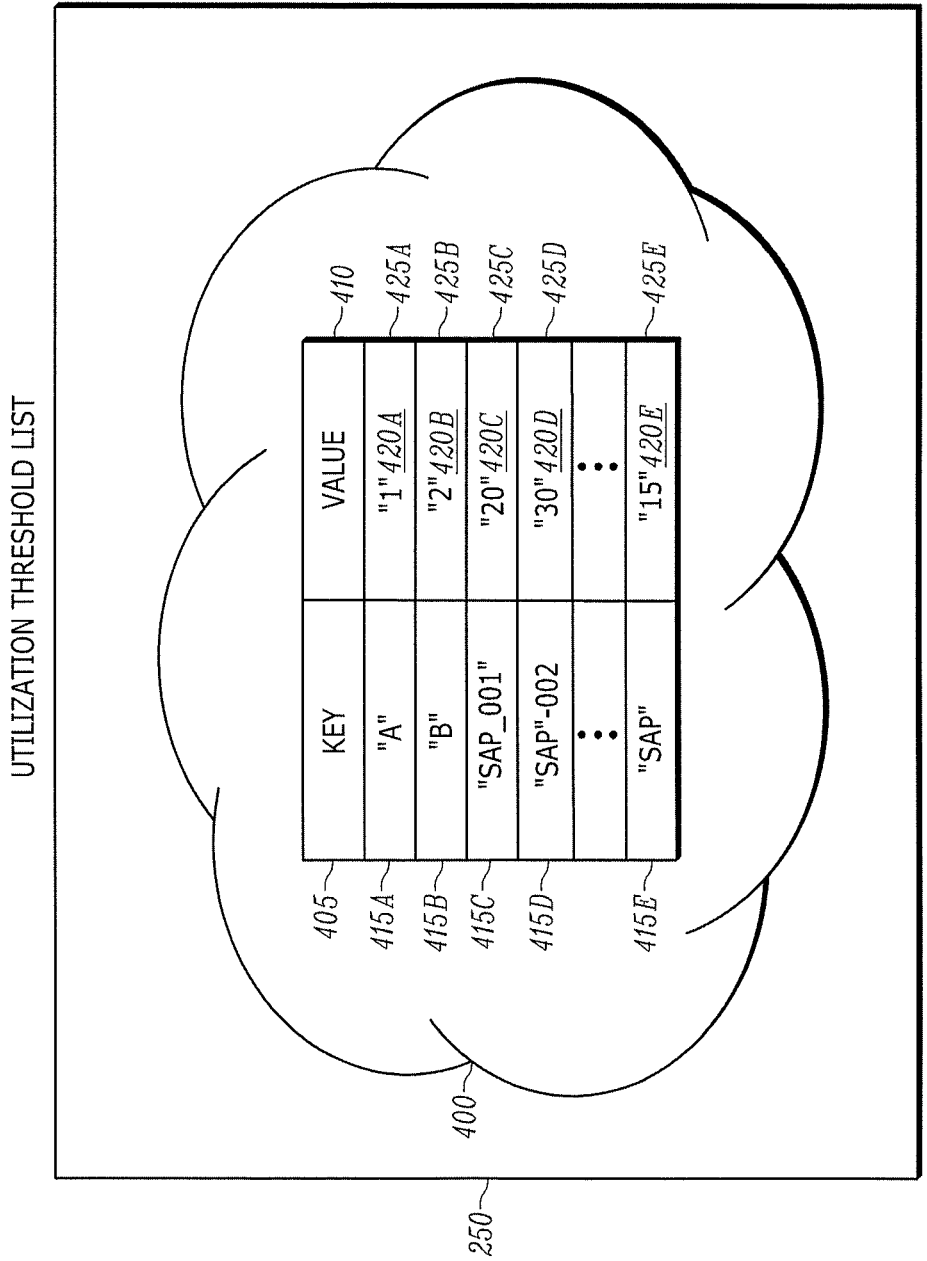
FIG. 4 shows an example of a utilization threshold list, represented in the recognizable human-readable format of a data table, in an embodiment.

FIG. 4 is a tabular representation of the data that is stored in a utilization threshold list 250. The tabular representation 400 is for ease of human comprehension; the actual utilization threshold list is stored in a machine readable format. The data includes at least one lookup key 405, presumed where not made explicit to be a key to the maximum network utilization for the reading entity, or the entity the reading is being performed on behalf of. Additionally, there is a value 410 paired with a key 405, that returns when the key value is queried for. The list 400 therefore includes of records 425 of key 415 and value 420 pairs. The list 400 can be added and removed from, and the keys 405 and values 410 can be updated in a bulk function, or individually, with records 425 having their keys 415 or values 420 changed.

Figure 5:
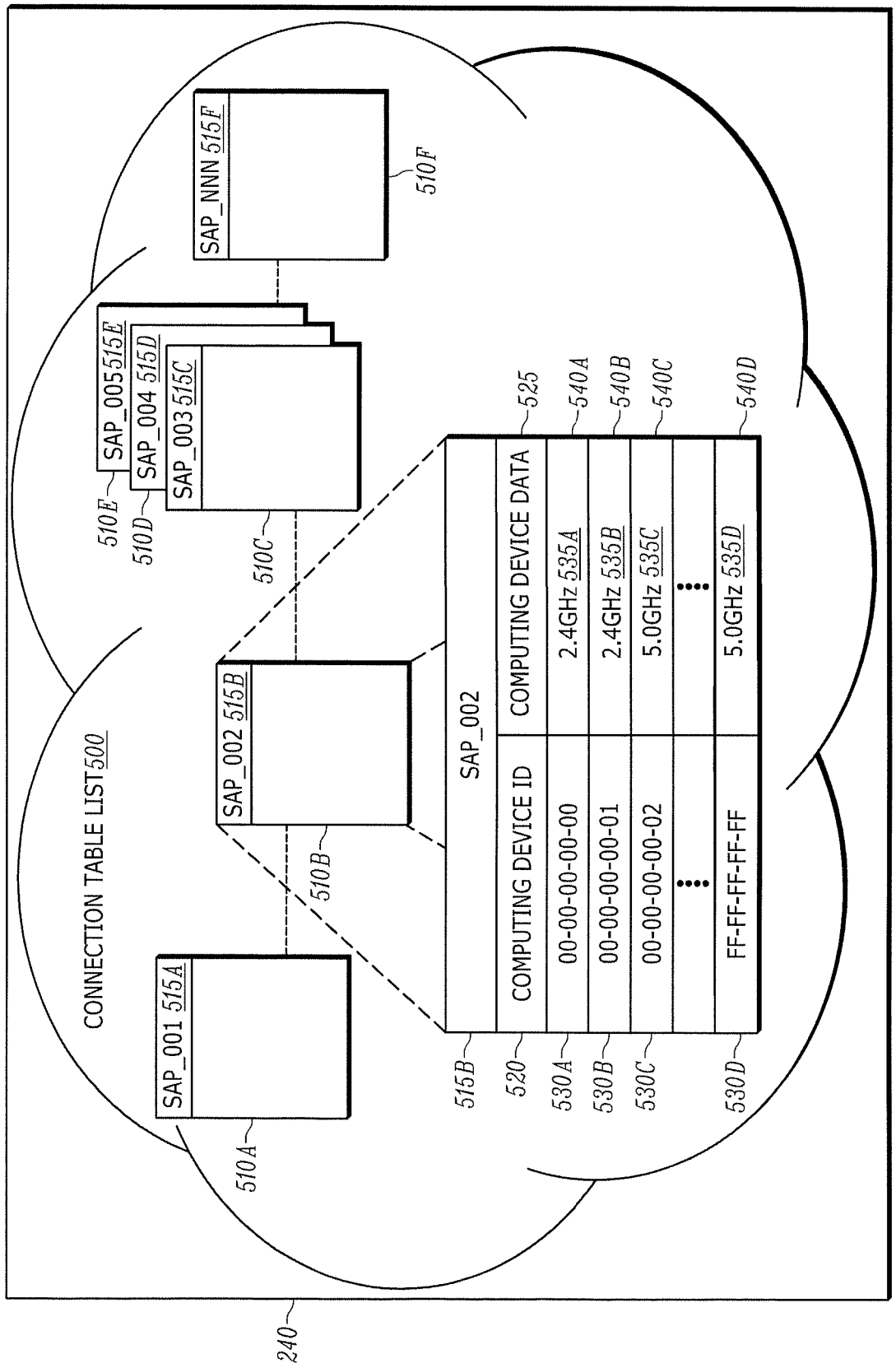
FIG. 5 shows an example of a connection table list, represented in the recognizable human readable format of a series of data tables, in an embodiment.

FIG. 5 is a diagram of the data that is stored in a connection table list 240. The diagram representation 500 is for ease of human comprehension; the actual connection table list is stored in a machine readable format. The data includes at one or more connection tables 510, with a specific wireless access point 200 association 515. A connection table 510 has a key of computing device identifying information 520, in this example a MAC address. It has a value 525 associated with the key 520 with data related to the computing device 105, such as current or projected or maximum network utilization. In this example, the value column 525 only contains the type of radio 211 with which the client is associated. The list 510 can be added to and removed from, and the computing device identifying information 520 and computing device data 525 can be updated in a bulk function, or individually, with records 540 having their computing device identifying information 530 or computing device data 535 changed.

Figure 6A:
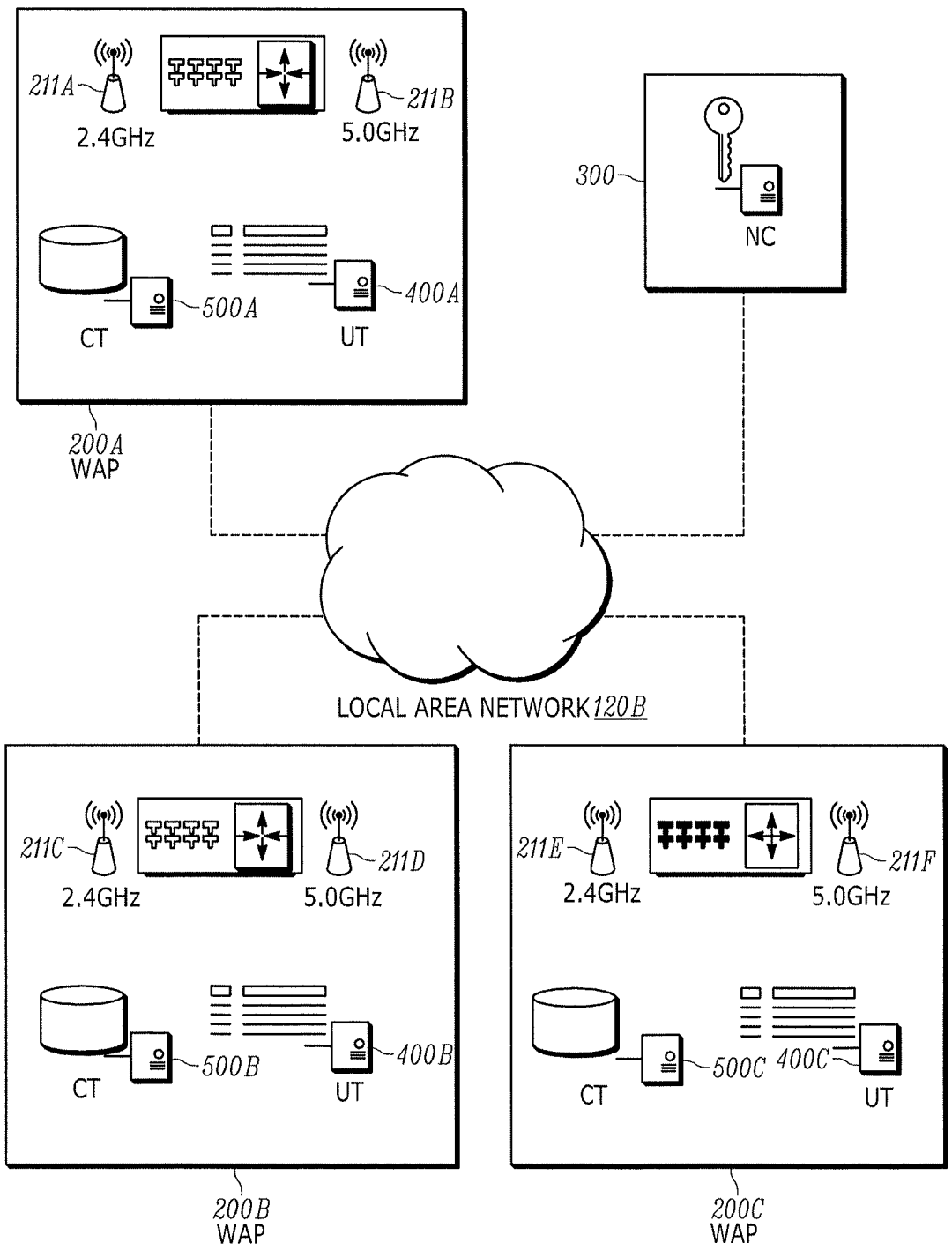
FIG. 6A is a network diagram of a potential network, one where there is a single network controller, and multiple wireless access points, in which each wireless access point stores and manages its own utilization threshold and connection table, in an embodiment.

FIG. 6A is a network diagram of a core self-sufficient network implementation, with a network controller 300 and three wireless access points 200A-C. Computing devices 105, wireless networks 110, and RF communication bands 115 are omitted. Each respective wireless access point 200A-C in this implementation includes two respective Wi-Fi radios: a 2.4 GHz radio 211A, 211C, and 211E; and a 5.0 GHz radio 211B, 211D, and 211F. Each wireless access point 200A-C contains a set value for maximum network utilization 400A-C local to that respective wireless access point 200A-C, and the values are capable of being different on different wireless access points 200A-C. Each wireless access point additionally contains a connection table 500A-C for storing information related to the computing devices 105 and their network utilization.

In this implementation, the network controller 300 does not contain connection tables 500 or utilization threshold values 400, but includes a computing device configuration policy 340 that directs wireless access points 200A-C in how to set their maximum network utilization in their own maximum network utilization set value 400A-C. The network controller 300 communicates these policies to the wireless access points 200A-C over the local area network 120.

Figure 6B:
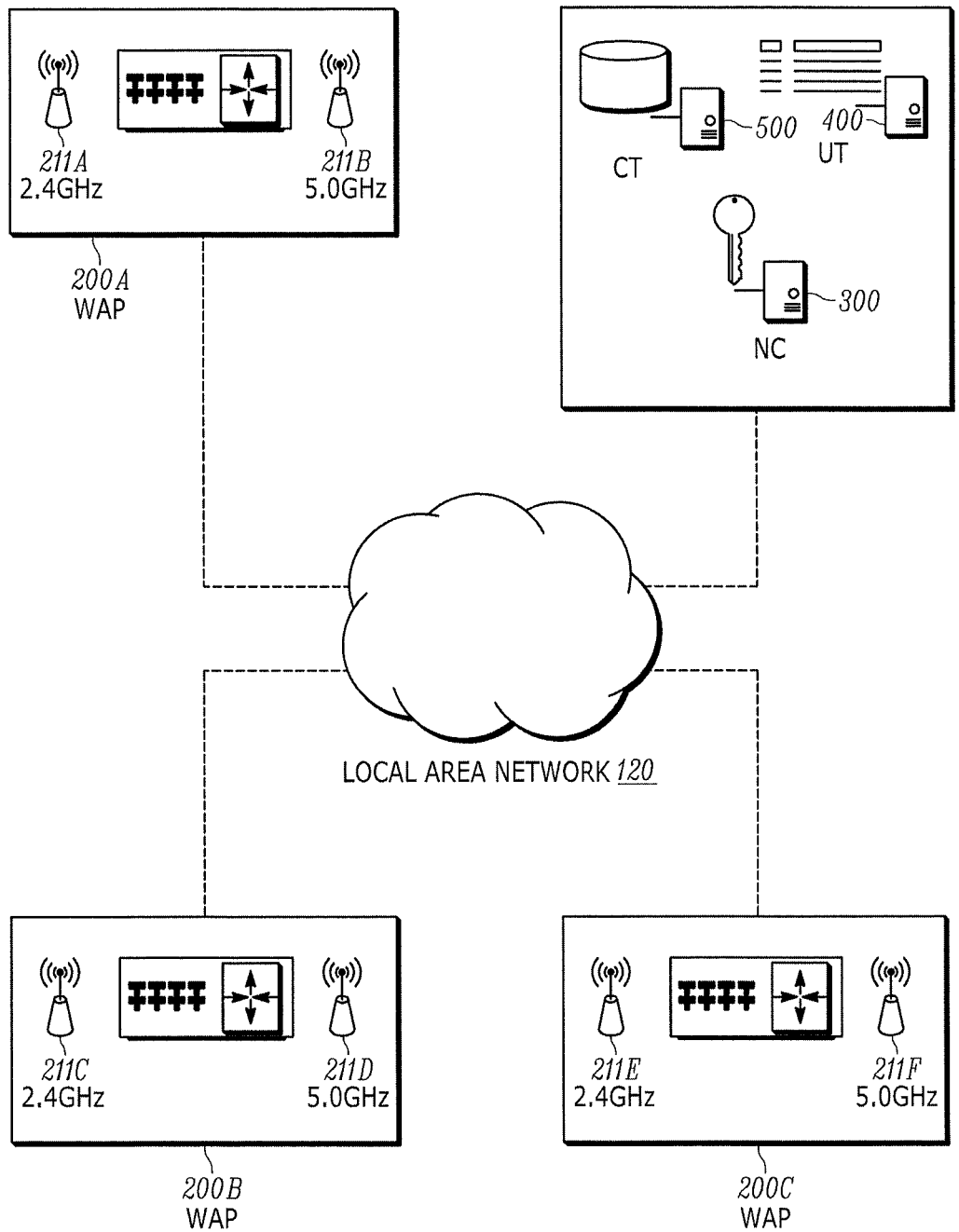
FIG. 6B is a network diagram of a potential network, one where there is a single network controller, and multiple wireless access points, in which the network controller manages all of the connection tables and utilization thresholds, in an embodiment.

FIG. 6B is a network diagram of a core managed network implementation, with a network controller 300 and three wireless access points 200A-C. Computing devices 105, wireless networks 110, and RF communication bands 115 are omitted. Each of the wireless access points 200A-C in this implementation includes two respective Wi-Fi radios, a 2.4 GHz radio 211A, 211C, and 211E; and a 5.0 GHz radio 211B, 211D, and 211F.

In this implementation, the network controller 300 contains connection tables 500 for storing information related to the computing devices 105 and their network utilization. It also contains the maximum network utilization values 400 that define the maximum network utilization per wireless access point 200. This network controller 300 does not form a chokepoint between the wireless access points 200 and the local area network 120, but rather directs the wireless access points 200 on whether to allow client devices 105 remain connected to the Wi-Fi radios 211, as well as whether the computing devices 105 can pass communications through the wireless access point 200 to the local area network 120. The network controller 300 communicates this to the wireless access points 200 over the local area network 120.

Figure 7A:
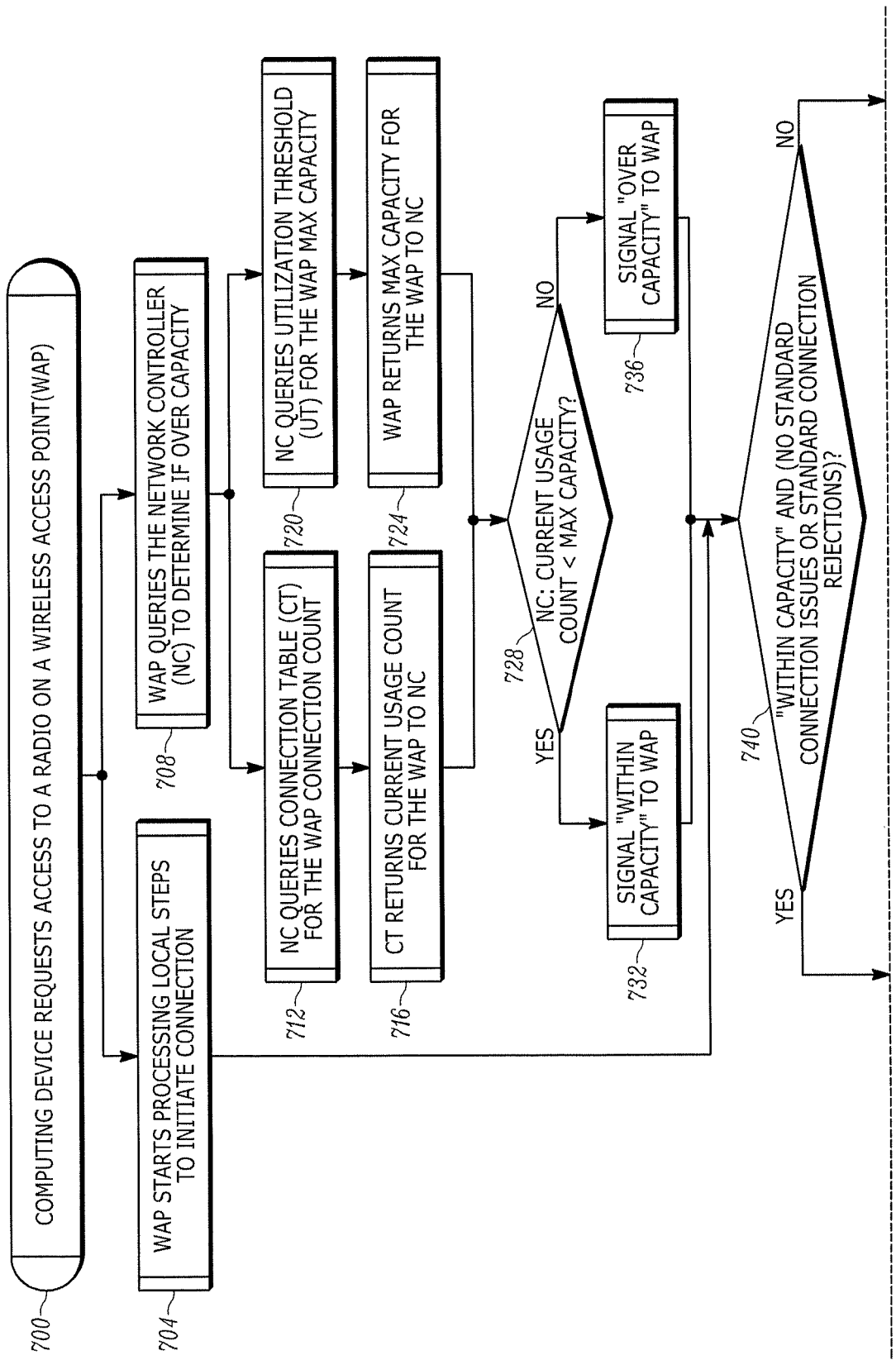
FIGS. 7A-B collectively form a flowchart of the operation of a connection attempt to the network by a computing device, where the network controller manages the utilization threshold and the connection table for a wireless access point, in an embodiment.
Figure 7B:
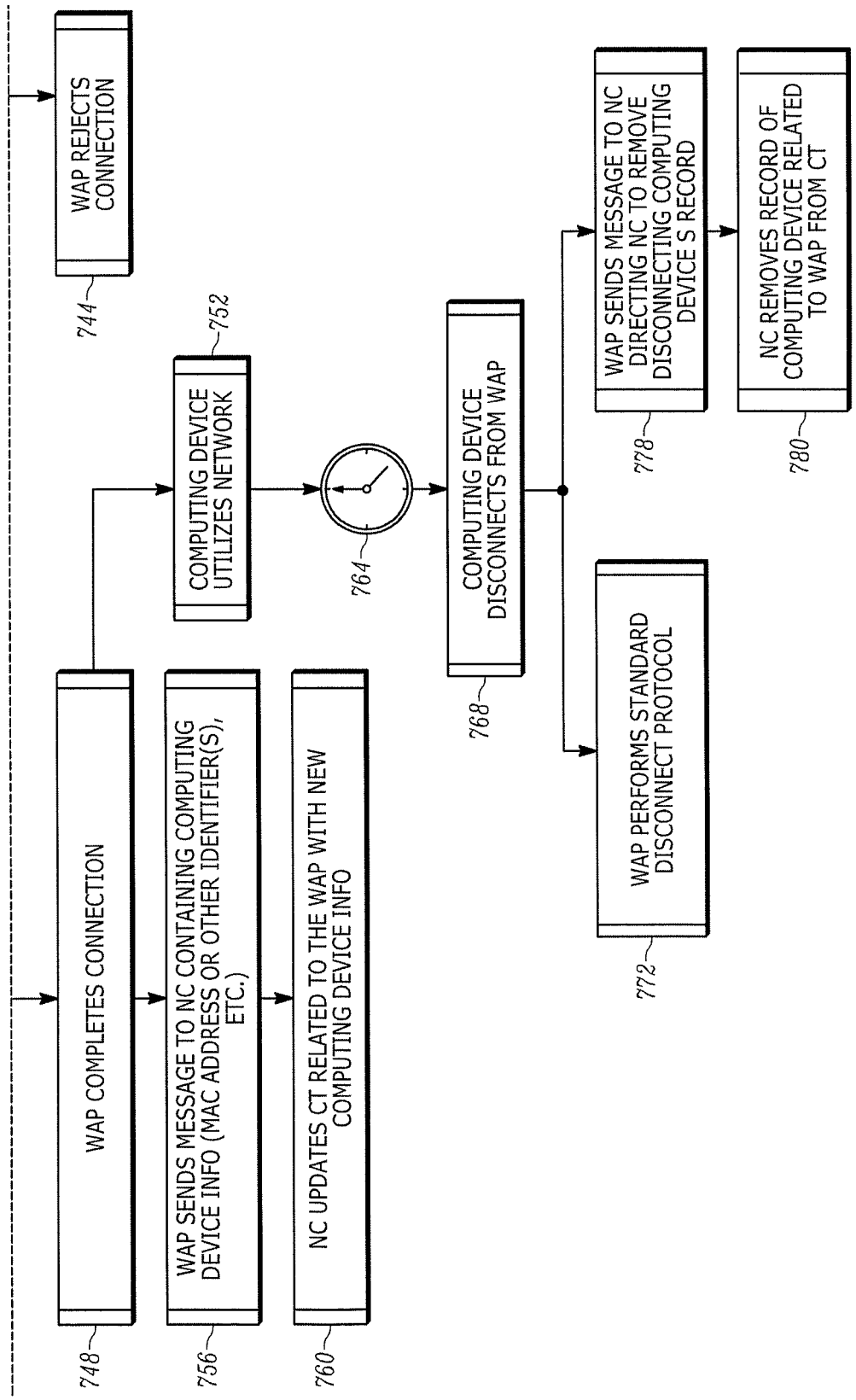

FIGS. 7A-B collectively form a flowchart of the operation of a connection attempt to the wireless communication system 100 by a computing device 105, where the network controller 300 manages the set values 400 and the connection tables 500 for a wireless access point 200. A connection attempt begins at Step 700, when a computing device 105 requests access to one of the radios on a wireless access point (WAP) 200. The WAP 200 initiates typical local actions related to connection, such as determining whether the computing device 105 is using a compatible communication standard, and checking whether appropriate connection channels are available at Step 704. If any of these actions result in an error or rejection, this information will be used in making a connection determination in Step 740. Simultaneous with Step 704, Step 708 begins, which involves the WAP 200 querying the network controller (NC) 300 regarding whether the WAP 200 has capacity for an additional connection. The NC 300, upon receiving this query, begins two processes. The first process is to determine the current computing device network utilization for the WAP 200, which requires querying the connection table (CT) 500 in step 712. The second process starts in Step 720, and involves querying the utilization threshold (UT) 400 to get the maximum computing device network utilization for the WAP 200. The CT 500 query completes, and the CT 500 returns the current computing device network utilization to the NC 300 for comparison in Step 716. Upon completion of the UT 400 query, the NC 300 is returned in Step 724 the maximum computing device network utilization for the WAP 200. Step 728 involves the NC 300 deciding whether the current computing device network utilization exceeds the maximum. If the maximum is exceeded, in Step 736 the NC 300 signals that the WAP 200 is over capacity to the WAP 200. If the maximum is not exceeded, Step 732 is the NC 300 signaling to the WAP 200 that the WAP 200 is within capacity.

Armed with information regarding computing device compatibility and computing device authorization from Step 704, and computing device capacity from Step 732 or Step 736, the WAP 200 is prepared to make a decision on connecting the computing device 105 in Step 740. If the computing device is not compatible, not authorized, generated an error or rejection, or the WAP 200 does not have enough network capacity available, the WAP 200 rejects the connection in Step 744, and the flow terminates. If the computing device 105 is compatible, authorized, generated no error or rejection, and the WAP 200 does have enough network capacity available, then the WAP 200 completes the connection attempt in Step 748. After the connection attempt is completed, the computing device 105 is able to utilize the local area network 120, as shown in Step 752. Upon completing the connection in Step 748, the WAP 200 additionally messages the NC 300 to instruct the NC 300 to update the CT 500 for the NAP 200 in Step 756, to include information about the recently connected computing device 105, so that future connection attempts by other computing devices 105 will have accurate information with regards to determining current computing device network utilization for the WAP 200. Upon receiving this message, the NC 300 updates the CT 500 for the WAP 200 with the computing device 105 information in Step 760.

After a period of time passes in Step 764, the computing device 105 will initiate a disconnection from the WAP 200 in Step 768. The WAP 200 at this point will perform disconnection protocols that a WAP 200 typically performs, such as making recently released radio band channels available, in Step 772. The NAP 200 additionally messages the NC 300 to remove the record in the in the CT 500 for the disconnected computing device 105 in Step 778, so that future connection attempts by computing devices 105 will have accurate information with regards to determining current computing device network utilization for the WAP 200. The NC 300 removes the disconnected computing device 105 record from the CT 500 in Step 780.

Figure 8A:
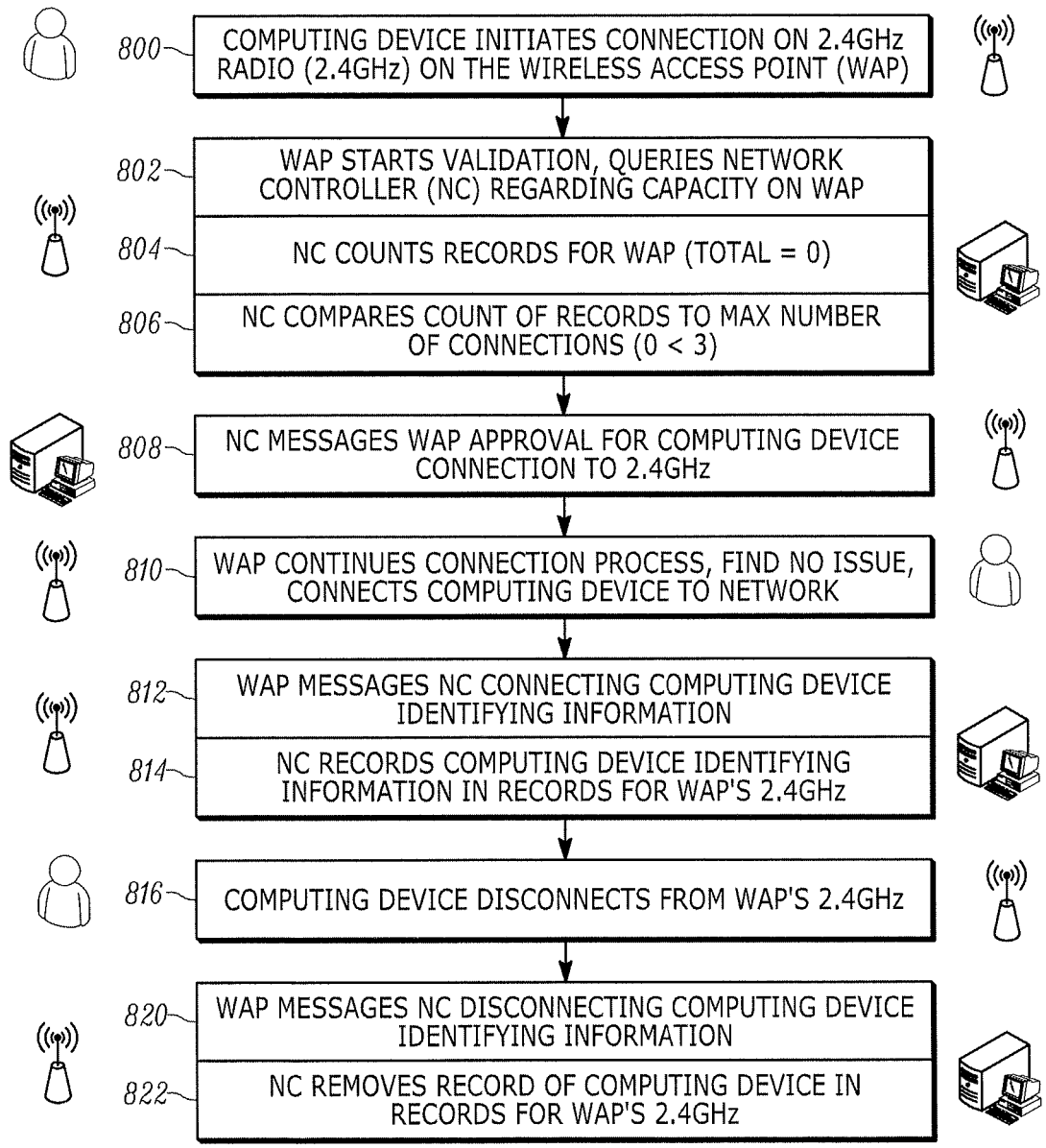
FIG. 8A is a ping pong diagram showing the communication process when a computing device attempts to connect to an unencumbered managed wireless access point.

FIG. 8A is an example similar to the wireless communication system 100 in FIG. 6B, including a local area network 120 that has a network controller 300, with integrated maximum connection value storage 400, and integrated connection table list 500. The local area network 120 has a single wireless access point 200, with no connections currently utilized. The network controller 300 also has a static value of "3" for the maximum number of connections to any wireless access point 200. The wireless access point 200 also has a maximum of "3" connections on the 2.4 GHz radio 211A, and "3" on the 5.0 GHz radio 211B.

A computing device 105 locates the wireless access point's 200 2.4 GHz 211A radio by the connection's SSID. The device initiates a connection in Step 800. The 2.4 GHz radio 211A begins the process of connecting in Step 802, for example determining whether the computing device 105 is using a compatible communication standard, and checking whether appropriate connection channels are available—in this example, the channels are available due to there being no computing devices 105 on the wireless communication system 100.

After performing initial access point-side checks, the wireless access point 200 sends a message across the local area network 120, querying the controller 300 as to whether the wireless access point 200 is at capacity, continuing Step 802. The controller 300 receives the query, and checks the connection table 510 related to the wireless access point 200, counting every record 540. It finds no records 540, because at this time there are no connections, and so has a value of "0" connections for the wireless access point 200 at Step 804. It then checks the maximum number of connections to any wireless access point 200, which in this example is "3". It confirms that the maximum number is greater than the count, checking whether 3 is greater than 0 as Step 806. Upon finding the maximum count is greater, it returns a message to the wireless access point 200 signaling that the wireless access point 200 may permit the connection in Step 808.

Upon receiving this message, the wireless access point 200 proceeds with any additional checks and steps to connect the computing device 105. Presuming no other issues with the connection process, the computing device 105 then is connected to the wireless access point 200 as Step 810. Upon completing the connection, the wireless access point 200 messages the controller 300, notifying that the wireless access point 200 has connected a computing device 105 in Step 812. In this example the wireless access point 200 sends the computing device's 105 Media Access Control (MAC) address to uniquely identify the computing device 105. Upon receiving this message, the network controller 300 adds the computing device 105 information to the connection table 500 for the wireless access point 200 as Step 814.

The computing device 105 utilizes the local area network 120 as they expected, and then in Step 816 disconnects from the wireless access point 200. After the disconnection, the wireless access point 200 messages the network controller 300 in Step 820, notifying that the computing device 105 is no longer connected to the wireless communication system 100. In Step 822, the network controller 300 then removes the record of the computing device 105 from the connection table 500 for the wireless access point 200.

Figure 8B:
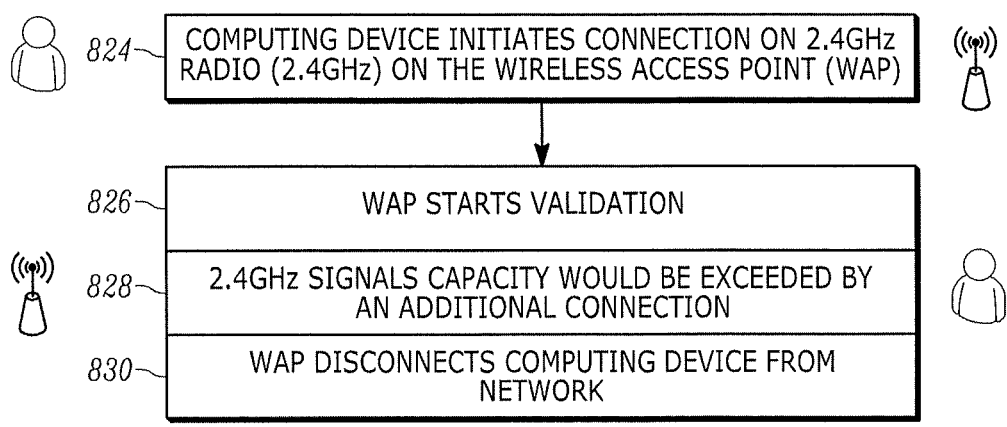
FIG. 8B is a ping pong diagram showing the communication process when a computing device attempts to connect to an encumbered managed wireless access point, when the encumbrance is on the radio to which the computing device attempts to connect, in an embodiment.

FIG. 8B is another example, similar to the wireless communication system 100 in FIG. 6B. The same initial conditions as the prior example FIG. 8A are present, with the alteration of 3 total connections to the 2.4 GHz radio 211A, and 0 total connections to the 5.0 GHz radio 211B. Step 824 begins with a $4^{th}$ computing device 105 attempting to connect to the 2.4 GHz radio 211A. The wireless access point 200 and 2.4 GHz radio 211A use their standard procedures to check capacity of the 2.4 GHz radio 211A in Step 826, and find it to be at capacity in Step 828. The $4^{th}$ computing device 105 is rejected in Step 830, and no messaging occurs related to maximum connection count between the wireless access point 200 and the network controller 300. Barring some other logging or monitoring process, the network controller 300 is unaware of the access attempt by the computing device 105.

Figure 8C:
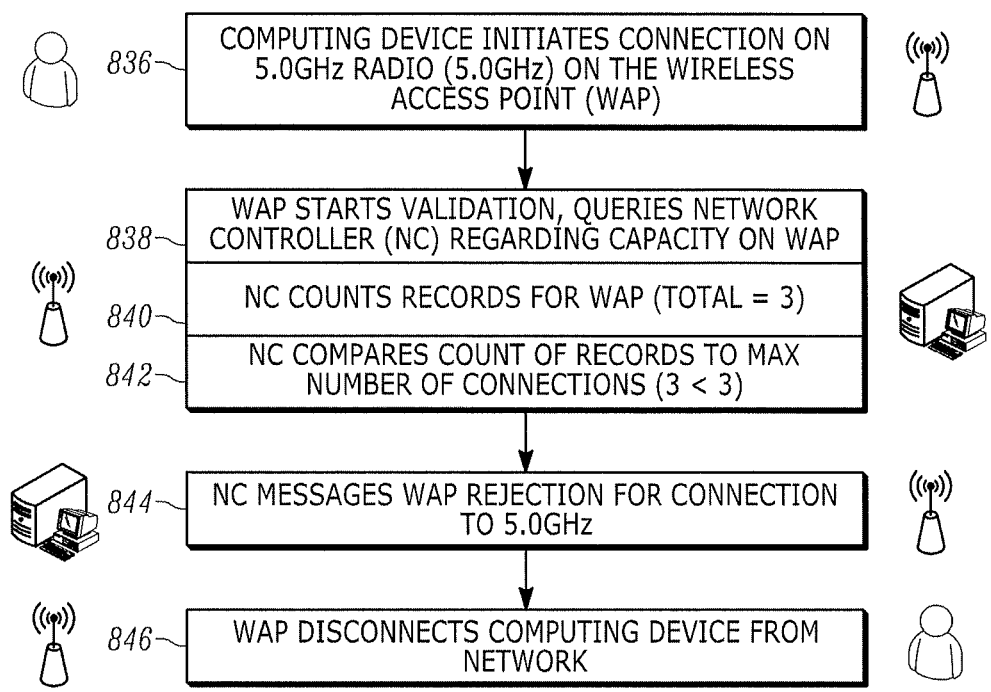
FIG. 8C is a ping pong diagram showing the communication process when a computing device attempts to connect to an encumbered managed wireless access point, when the encumbrance is not on the radio to which the computing device attempts to connect, in an embodiment.

FIG. 8C is a third example, similar to the wireless communication system 100 in FIG. 6B, with the same initial conditions as the prior example. A $4^{th}$ computing device 105 attempts to connect to the 5.0 GHz radio 211B in Step 836. The wireless access point 200 and 5.0 GHz radio 211B use their standard procedures to initiate connection to the 5.0 GHz radio 211B in Step 838, notably finding that the 5.0 GHz radio 211B itself has sufficient capacity.

After performing initial access point-side checks, the wireless access point 200 continues Step 838 and sends a message across the local area network 120, querying the network controller 300 as to whether the wireless access point 200 is at capacity. The network controller 300 receives the query, and checks the connection table 510 related to the wireless access point 200 in Step 840, counting every record 540. It finds three records 540, because at this time there are three connections, and so has a value of "3" connections for the wireless access point 200. It then checks the maximum number of connections to any wireless access point 200, which in this example is "3". In Step 842 it confirms that the maximum number is greater than the count, checking whether 3 is greater than 3. Upon finding the maximum count is not greater, in Step 844 it returns a message to the wireless access point 200 signaling that the wireless access point 200 reject the connection. Upon receiving this message, the wireless access point 200 rejects the computing device 105 connection to the wireless access point 200 in Step 846.

Figure 8D:
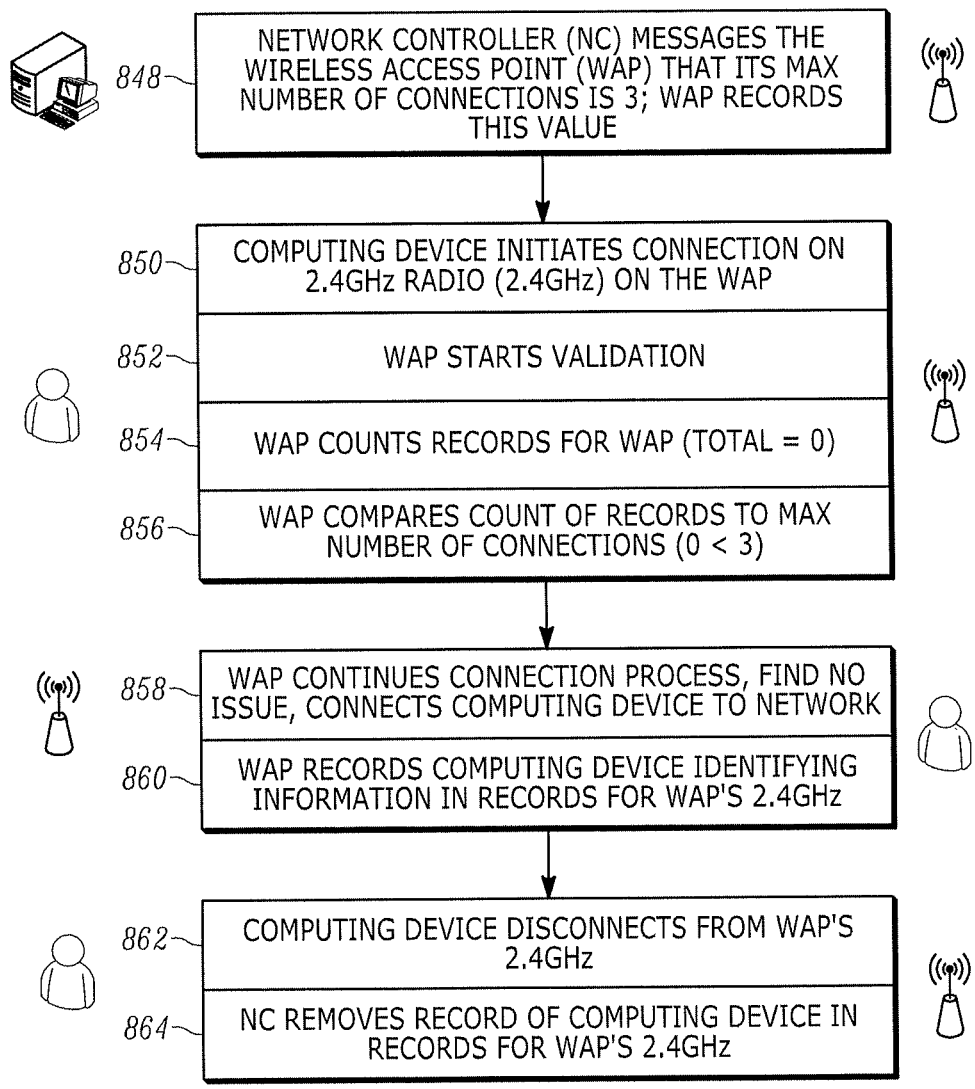
FIG. 8D is a ping pong diagram showing the communication process when a computing device attempts to connect to an unencumbered self-sufficient wireless access point, in an embodiment.

FIG. 8D is a further example. The wireless communication system 100 in this example is configured differently, in more of a manner similar to FIG. 6A. The connection table 500 is maintained on the singular wireless access point 200, as well as the network utilization thresholds 400. The network controller 300 does not maintain connection list storage 500, but does contain a computing device configuration policy 340 stating the maximum connections for any WAP 200 is "3". The wireless access point 200 has a maximum of "3" connections on the 2.4 GHz radio 211A, and "3" on the 5.0 GHz radio 211B. There are currently no connections to the wireless access point 200.

Upon network 100 initialization, Step 848 includes the network controller 300 querying the computing device configuration policies 340 for the maximum connections to any wireless access point 200. The computing device configuration policy returns the value "3". The controller 300 then pushes a message to the wireless access point 200 notifying that the wireless access point's 200 maximum connection count is "3". Upon receiving this message, the access point 200 directs its set value storage 400 to update the maximum connection value to "3".

A computing device 105 locates the wireless access point's 200 2.4 GHz 211A radio by the connection's SSID. The device initiates a connection in Step 850. The 2.4 GHz radio 211A begins the process of connecting in Step 852, for example determining whether the computing device 105 is using a compatible communication standard, and checking whether appropriate connection channels are available—in this example, the channels are available due to there being no computing devices 105 on the network 100.

After performing initial access point-side checks, Step 854 has the wireless access point 200 checking the connection table 510 related to the wireless access point 200, counting every record 540. It finds no records 540, because at this time there are no connections, and so has a value of "0" connections 100. It then checks the maximum number of connections to any access point 200, which in this example is "3". It confirms that the maximum number is greater than the count, checking whether 3 is greater than 0 in Step 856. Upon finding the maximum count is greater, the access point 200 proceeds with any additional checks and steps to connect the computing device 105 for Step 858. Presuming no other issues with the connection process, the computing device 105 then is connected to the access point 200.

Upon completing the connection, Step 860 involves the wireless access point 200 adding the computing device 105 information to the connection table 500. In this example the wireless access point 200 stores the computing device's 105 Media Access Control (MAC) address to uniquely identify the computing device 105.

The computing device 105 utilizes the network as they expected, and then disconnects from the network in Step 862. Step 864 is after the disconnection, where the wireless access point 200 removes the record of the computing device 105 from the connection table 500.

In general, the term "functions," as used herein, refers to logic embodied in hardware software instructions, which can be written in a programming language, such as Java™, C, C++, C#, for example. A software function can be compiled into executable programs or written in interpreted programming languages, such as Perl, Visual Basic script, HTML, or JavaScript. Software functions may be callable from other functions. Generally, functions described herein refer to logical modules that may be merged with other modules or divided into sub-module despite their physical organization. The functions can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of executable code and/or associated data that is carried on or embodied in a type of machine readable medium. For example, programming code could include code for the server or the sending device for generating meta-data files and programming for the receiving device for reproducing content based on the meta-data files. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the service provider into the computer platforms of the wireless access point and computing devices. Thus, another type of media that may bear the programming, media content or meta-data files includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine readable medium may take many forms of tangible storage medium. Non-volatile storage media include, for example, optical or magnetic disks, such as any of the storage devices in any computer(s) or the like, such as may be used to implement the computing device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims. [73] It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A wireless communication system comprising:
a wireless access point including:
a group of multiple radio frequency (RF) communication band interfaces for establishing and maintaining computing device connections and communications over a wireless network having multiple RF communication bands, wherein:
each RF communication band interface is for RF communication over one of the RF band communication bands, and
each RF communication band is a contiguous section of RF spectrum frequencies on the wireless network;
a processor coupled to the group of RF communication band interfaces;
a memory accessible to the processor and including a multiple RF communication band utilization imposing a combined wireless network capacity utilization limit on at least two of the multiple RF communication bands; and
programming in the memory, wherein execution of the programming by the processor configures the wireless communication system to perform functions, including functions to:
receive a connection request from a pending computing device to connect via one of the multiple RF communication bands of the wireless network;
in response to receiving the connection request from the pending computing device, determine whether the multiple RF communication band utilization threshold is exceeded by the connection request from the pending computing device; and
in response to determining that the multiple RF communication band communication utilization threshold is not exceeded, establish connection with the pending computing device via one of the multiple RF communication bands of the wireless network to enable communication of the pending computing device over the wireless network, wherein the determining comprises:
calculating a total number of currently connected computing devices to the multiple RF communication bands; and
comparing the total number of the currently connected computing devices with the multiple RF communication band utilization threshold, where the multiple RF communication band utilization threshold is a total connection limit across at least two of the multiple RF communication bands of the wireless network.

2. The wireless communication system of claim 1, wherein:
the memory further includes a multiple RF communication band connection tracking table that includes RF connection records, each RF connection record identifying a respective one of the currently connected computing devices that are currently connected to the wireless network via one of the multiple RF communication bands.

3. The wireless communication system of claim 2, wherein:
the each RF connection record identifies:
a respective bandwidth utilization of the respective currently connected computing device over a predetermined time period;
execution of the programming by the processor further configures the wireless communication system to perform functions, including functions to calculate a total bandwidth usage of the currently connected computing devices based on the RF connection records;

the multiple RF communication band utilization threshold is a bandwidth limit across at least two of the multiple RF communication bands of the wireless network; and determining whether the multiple RF communication band utilization threshold is exceeded includes comparing the total bandwidth usage with the total bandwidth limit.

4. The wireless communication system of claim 1, wherein execution of the programming by the processor further configures the wireless communication system to perform functions, including functions to:

receive a second connection request from a second pending computing device to connect via one of the multiple RF communication bands of the wireless network to enable communication over the wireless network;

in response to receiving the second connection request from the second pending computing device, determine whether the multiple RF communication band utilization threshold is exceeded by the second connection request from the second pending computing device; and in response to determining that the multiple RF communication band utilization threshold is exceeded, reject connection with the second pending computing device via one of the multiple RF communication bands of the wireless network.

5. The wireless communication system of claim 1, wherein:

the wireless access point further includes a network communication interface for communication over a local area network or a wide area network;

the processor is further coupled to the network communication interface; and execution of the programming by the processor further configures the wireless communication system to perform functions, including functions to:

based on establishing connection with the pending computing device via one of the multiple RF communication bands of the wireless network, allow communication of the pending computing device over the local area network or the wide area network through the network communication interface.

6. The wireless communication system of claim 1, wherein:

the processor comprises a first processor and a second processor;

the memory comprises a first memory and a second memory;

the wireless access point includes:

the first processor;

a first network communication interface accessible to the first processor for communication over a local area network or a wide area network with a network controller;

the first memory; and programming in the first memory, wherein execution of the programming by the first processor configures the wireless access point to perform the functions to:

receive the connection request from the pending computing device to connect via one of the multiple RF communication bands of the wireless network and establish connection with the pending computing device via one of the multiple RF communication bands of the wireless network to enable communication over the wireless network; and the system further comprises the network controller, wherein the network controller includes:

the second processor;

a second network communication interface accessible to the second processor for communication over the local area network or the wide area network with the wireless access point;

the second memory; and programming in the second memory, wherein execution of the programming by the second processor configures the network controller to perform the function to determine whether the multiple RF communication band utilization threshold is exceeded by the connection request from the pending computing device.

7. The wireless communication system of claim 6, wherein in response to receiving the connection request from the pending computing device, execution of the programming by the first processor further configures the wireless access point to:

transmit, via the first network communication interface, an authorized connection instruction requesting the network controller to determine whether the multiple RF communication band utilization threshold is exceeded by the connection request from the pending computing device; and in response to receiving, from the network controller, the authorized connection instruction determining that the multiple RF communication band communication utilization threshold is not exceeded, establish connection with the pending computing device via one of the multiple RF communication bands of the wireless network to enable communication of the pending computing device over the wireless network.

8. A method comprising:

receiving a connection request from a pending computing device to connect via one of multiple RF communication bands of a wireless network;

in response to receiving the connection request from the pending computing device, determining whether a multiple RF communication band utilization threshold is exceeded by the connection request from the pending computing device; and in response to determining that the multiple RF communication band communication utilization threshold is not exceeded, establishing connection with the pending computing device via one of the multiple RF communication bands of the wireless network to enable communication of the pending computing device over the wireless network, wherein the determining comprises:

calculating a total number of currently connected computing devices to the multiple RF communication bands; and comparing the total number of the currently connected computing devices with the multiple RF communication band utilization threshold, where the multiple RF communication band utilization threshold is a total connection limit across at least two of the multiple RF communication bands of the wireless network.

9. The method of claim 8, wherein a connection tracking table stored in the memory includes one or more IRF connection records, and wherein each of the one or more RF connection records identifies a respective one of the currently connected computing devices.

10. The method of claim 8, wherein determining whether the multiple RF communication band utilization threshold is exceeded by the connection request from the pending computing device further comprises:
calculating a total bandwidth usage of currently connected computing devices to the multiple RF communication bands; and
comparing the total bandwidth usage with the multiple RF communication band utilization threshold, where the multiple RF communication band utilization threshold is a bandwidth limit across at least two of the multiple RF communication bands of the wireless network.

11. The method of claim 8, further comprising:
receiving a second connection request from a second pending computing device to connect via one of multiple RF communication bands of a wireless network to enable communication over the wireless network;
in response to receiving the second connection request from the second pending computing device, determining whether the multiple RF communication band utilization threshold is exceeded by the second connection request from the second pending computing device; and
in response to determining that the multiple RF communication band utilization threshold is exceeded, rejecting connection with the second pending computing device via one of the multiple RF communication bands of the wireless network.

12. The method of claim 8, further comprising:
based on establishing connection with the pending computing device via one of the multiple RF communication bands of the wireless network, allowing communication of the pending computing device over a local area network or a wide area network through the network communication interface.

13. The method of claim 8, further comprising:
receiving the connection request from the pending computing device to connect via one of multiple RF communication bands of a wireless network on a first network device;
in response to receiving the connection request from the pending computing device, determining whether the multiple RF communication band utilization threshold is exceeded by the connection request from the pending computing device on a second network device; and
in response to determining that the multiple RF communication band communication utilization threshold is not exceeded on the second device, establishing connection with the pending computing device via one of the multiple RF communication bands of the wireless network to enable communication of the pending computing device over the wireless network on the first network device.

14. The method of claim 13 further comprising:
transmitting, via the first network device, an authorized connection instruction requesting the second network device to determine whether the multiple RF communication band utilization threshold is exceeded by the connection request from the pending computing device; and
in response to receiving on the first network device, from the second network device, the authorized connection instruction determining that the multiple RF communication band communication utilization threshold is not exceeded, the first network device establishing connection with the pending computing device via one of the multiple RF communication bands of the wireless network to enable communication of the pending computing device over the wireless network.

15. A non-transitory machine-readable medium containing machine-readable programming instructions, the instructions causing a wireless communication system to:
receive a connection request from a pending computing device to connect via one of multiple RF communication bands of a wireless network;
in response to receiving the connection request from the pending computing device, determine whether a multiple RF communication band utilization threshold is exceeded by the connection request from the pending computing device; and
in response to determining that the multiple RF communication band communication utilization threshold is not exceeded, establish connection with the pending computing device via one of the multiple RF communication bands of the wireless network to enable communication of the pending computing device over the wireless network, wherein the determining comprises:
calculating a total number of currently connected computing devices to the multiple RF communication bands; and
comparing the total number of the currently connected computing devices with the multiple RF communication band utilization threshold, where the multiple RF communication band utilization threshold is a total connection limit across at least two of the multiple RF communication bands of the wireless network.

16. The machine-readable medium of claim 15, wherein a connection tracking table stored in the memory includes one or more RF connection records, and wherein each of the one or more RF connection records identifies a respective one of the currently connected computing devices.

17. The machine-readable medium of claim 15, wherein the instruction to determine whether the multiple RF communication band utilization threshold is exceeded by the connection request from the pending computing further comprises instructions to:
calculate a total bandwidth usage of the currently connected computing devices via the multiple RF communication bands; and
determine whether the multiple RF communication band utilization threshold is exceeded, including comparing the total number of the currently connected computing devices with the bandwidth limit across at least two of the multiple RF communication bands of the wireless network.

18. The machine-readable medium of claim 15, wherein the instructions further cause the wireless communication system to:
receive a second connection request from a second pending computing device to connect via one of the multiple RF communication bands of the wireless network to enable communication over the wireless network;
in response to receiving the second connection request from the second pending computing device, determine whether the multiple RF communication band utilization threshold is exceeded by the second connection request from the second pending computing device; and
in response to determining that the multiple RF communication band utilization threshold is exceeded, reject connection with the second pending computing device via one of the multiple RF communication bands of the wireless network.

19. The machine-readable medium of claim 15, wherein the instructions further cause the wireless communication system to:
- based on establishing connection with the pending computing device via one of the multiple RF communication bands of the wireless network, allow communication of the pending computing device over a local area network or a wide area network through the network communication interface.

20. The machine-readable medium of claim 15, wherein the instructions further cause the wireless communication system to:
- receive the connection request from the pending computing device to connect via one of the multiple RF communication bands of the wireless network on a first device;
- establish connection with the pending computing device via one of the multiple RF communication bands of the wireless network to enable communication over the wireless network by the first device; and
- determine whether the multiple RF communication band utilization threshold is exceeded by the connection request from the pending computing device on a second device.

* * * * *